No. 671,478. Patented Apr. 9, 1901.
J. GRIMME.
VEHICLE DRIVING MECHANISM.
(Application filed Mar. 10, 1900.)
(No Model.)

Witnesses:
Arthur Scholz.
Josef Lohre.

Inventor:
Johannes Grimme
by Wm. E. Poulter
Attorney

UNITED STATES PATENT OFFICE.

JOHANNES GRIMME, OF BOCHUM, GERMANY.

VEHICLE DRIVING MECHANISM.

SPECIFICATION forming part of Letters Patent No. 671,478, dated April 9, 1901.

Application filed March 10, 1900. Serial No. 8,223. (No model.)

*To all whom it may concern:*

Be it known that I, JOHANNES GRIMME, a subject of the King of Prussia, German Emperor, and a resident of Bochum, in the Province of Westphalia, German Empire, have invented certain new and useful Improvements in Vehicle Driving Mechanism, of which the following is an exact specification.

The present invention relates to improvements in velocipedes, and has for its object to provide a hand propelling mechanism for such vehicles.

A chief feature of my invention is that the center of gravity of the vehicle never is altered, as hitherto was the case with the mechanisms generally employed.

A second feature of my mechanism is its great simplicity.

The purpose of my invention is to render bicycle-riding more safe and to allow of all force of the rider being utilized.

In my invention I employ levers moving like ordinary handle-bars in a horizontal plane. These levers are arranged in such manner that the vehicle always is in equilibrium.

The hand-propeller forming the subject-matter of my invention is sufficient for driving the vehicle and it is absolutely superfluous to employ the feet for this purpose.

My mechanism will be more fully understood with reference to the accompanying drawings, in which—

Figure 1:
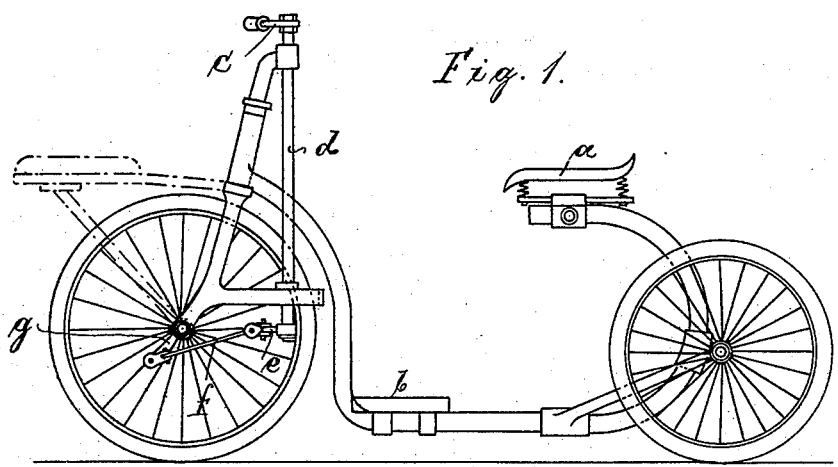
Figure 2:
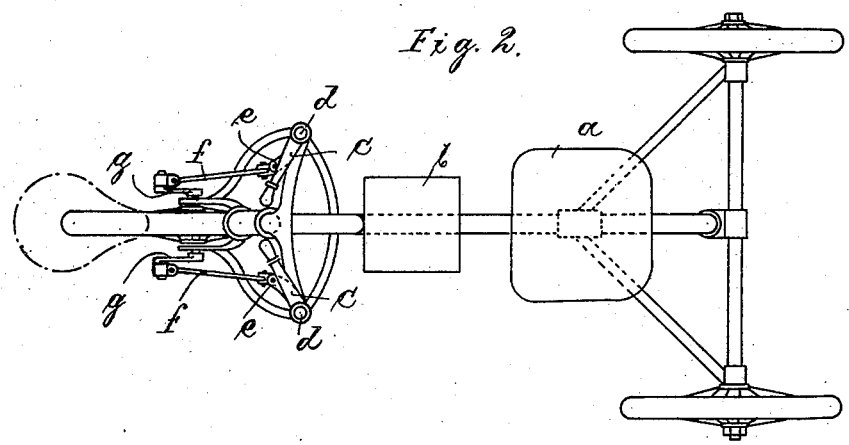

Figure 1 illustrates a vertical elevation view of a tricycle according to my invention. Fig. 2 is a top view of the same.

The rider sits upon the saddle $a$ and reposes his feet upon the step-board $b$. The levers $c$ are arranged symmetrically to the center line of the vehicle and act upon vertical shafts $d\ d$, arranged laterally to the frame of the front wheel. The shafts $d\ d$ at their lower extremities are provided with levers $e\ e$, actuating, by means of a connecting-rod $f$, the cranks $g$, fixed to the driving-axis of the front wheel. The cranks $g\ g$ are mounted so as to project in one direction, but not, as ordinarily, under a certain angle. This is for the purpose of allowing all forces when riding the machine to be exerted upon the axis of the wheel from one and the same direction, owing to which only the driving and steering of the machine simultaneously is rendered possible. When the hand-levers $c$ are moved horizontally, the levers $e$ oscillate, while the cranks $g$ describe a circular movement in vertical plane. To effect this movement, both connecting-rods $f$ are connected with the cranks $g$ and levers $e$ by links.

In the construction as illustrated in the drawings single levers are provided, being adapted to be moved forward or backward in the manner of oars.

Having thus fully described the nature of this invention, what I desire to secure by Letters Patent of the United States is—

In velocipedes, the application of a hand driving mechanism to the frame of the front wheel, so as, when steering the wheel, to be rotated with it, said mechanism consisting of rods $d$ mounted in the frame of the front wheel and provided with handles $c$, of levers $e\ e$, connecting-rods $f\ f$ and cranks $g\ g$ projecting in one direction, all these parts suitably connected to each other and transmitting the movement of the handles $c\ c$ to the front wheel, the whole for the purpose as set forth.

In witness whereof I have hereunto set my hand in presence of two witnesses.

JOHANNES GRIMME.

Witnesses:
 WOLDEMAR HAUPT,
 HENRY HASPER.